Patented Feb. 10, 1953

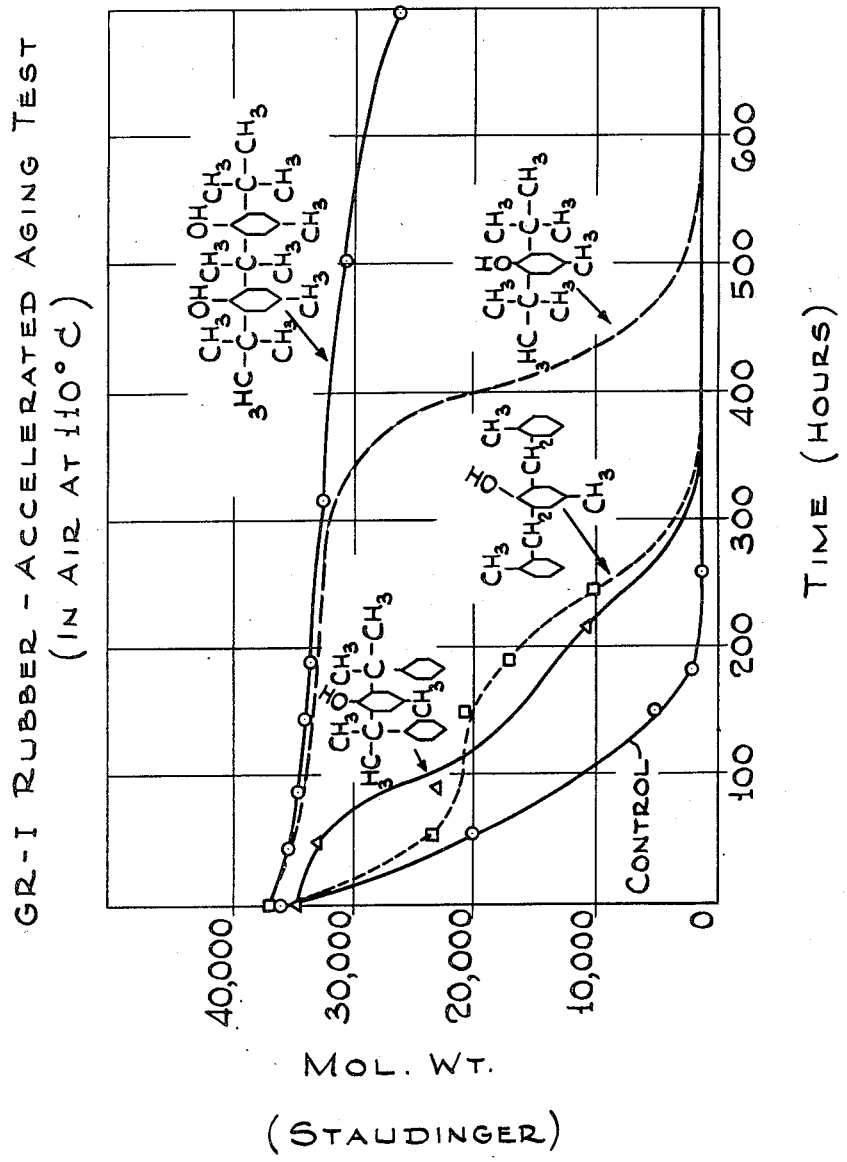

2,628,212

UNITED STATES PATENT OFFICE 2,628,212

STABILIZED SYNTHETIC RUBBER COMPOSITIONS CONTAINING 2,2-BIS(2-HYDROXY-3-T-BUTYL-5 METHYLPHENYL)-PROPANE

David W. Young, Roselle, N. J., assignor to Standard Oil Development Company, a corporation of Delaware Application December 10, 1949, Serial No. 132,282

3 Claims. (Cl. 260—45.95)

This invention relates to the stabilization of organic compounds which tend to deteriorate in storage or in use due to undesirable oxidation reactions. In accordance with this invention, these organic compounds, and especially hydrocarbon type compounds, are stabilized against oxidation by incorporating therein small amounts of 2,2-bis(2-hydroxy-3-t-butyl-5 methylphenyl)-propane.

It is known that synthetic rubbers undergo changes due to further polymerization or degradation due to depolymerization on exposure to air and consequently yield on vulcanization inferior products unless there is incorporated therewith at time of synthesis a compound which stabilizes the synthetic rubber by largely preventing oxidation, degradation and/or cyclization of the chain molecules present in the polymer structure. Natural, as well as synthetic, rubbers require an anti-oxidant present in the vulcanizate in order that finished rubber products are stable toward oxidation and heat during their useful life.

It has now been found that 2,2-bis(2-hydroxy-3-t-butyl-5 methylphenyl)-propane is an extremely effective oxidation inhibitor, and stabilizer for many materials which usually degrade in the presence of air and/or heat. The structure of this compound is shown in Formula I below:

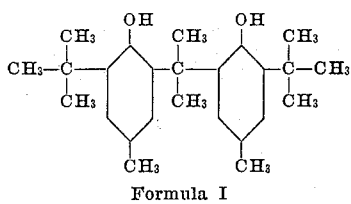

Formula I

Bis-phenols other than this compound have been employed in the past as anti-oxidants. The compound of this invention is surprisingly superior to these other bis-phenols in that it is far better for similar applications for which other bis-phenols have been previously employed and in addition it is useful in a much wider variety of normally oxidizable substances. This superiority of oxidation inhibition is believed to reside in the spatial configuration of the compound of this invention, i. e. that it is specifically a 2,2-bis(hydroxyphenyl) propane derivative with the hydroxyl group ortho to the propane linkage of the phenyl group and the tertiary butyl group ortho to the hydroxyl group.

The compound of this invention, which, as stated above, is believed to be novel, may be prepared in general by the condensation reaction of two moles of 2-tertiary-butyl-4 methylphenol with 1 mole of acetone. Approximately 1 to 3 moles of sulfuric acid or hydrochloric acid and traces of alpha-mercaptopropionic acid and or thioglycolic acid as well as $H_2S$ are employed to catalyze the reaction. A solvent such as heptane or isopropanol is also employed and the temperature is maintained at an upper limit of about 60° C. The desired compounds which are water-insoluble and are contained in the solvent are then washed with water or 5% sodium carbonate. The solvent is then evaporated and the product is obtained in relatively pure form.

The preparation of the reactants employed in the indicated reaction are well known in the art and need not be given here.

The following examples are given to illustrate this invention and include both the preparation of the 2,2-bis(2-hydroxy-3-t-butyl-5 methylphenyl)-propane of this invention and test results on the compound used as an anti-oxidant.

EXAMPLE 1

Preparation of 2,2-bis(2-hydroxy-3-t-butyl-5 methylphenyl)-propane p-Cresol was alkylated with isobutylene to form 2-t-butyl-4-methylphenol (B. Pt. 240–258° C.). Then 126 grams of this material was reacted with 29 grams of acetone in the presence of 2 moles of conc. HCl acid and 6 grams of thioglycolic acid. The materials were cooled and about 100 g. of $CaCl_2$ was slowly added. The mixture was well agitated for 27 hours at 30° C. The organic materials were dissolved in isopropyl alcohol, and then allowed to evaporate on a steam batch very slowly. Under these conditions white crystals separated slowly from the mother liquor after the acetone had all been removed along with the alcohol. The product was dried in an oven under 25″ vacuum at 70° C. The weight of 2,2-bis(2-hydroxy-3-t-butyl-5 methylphenyl)-propane obtained was 73 grams. The inspections on the product are listed:

|  | Found | Theory |
|---|---|---|
| Percent C | 81.44 | 81.50 |
| Percent H | 10.38 | 9.78 |
| Molecular Weight | 360 | 368 |
| Melting Point °C | 163 |  |

EXAMPLE 2

2,2-bis(2-hydroxy-3-t-butyl-5 methylphenyl)-propane was tested for its oxidation inhibiting efficiency on GR–I rubber (low unsaturation isobutylene-diolefin polymer, see U. S. 2,356,128), a copolymer of isobutylene and isoprene. This test was conducted as follows: A small piece of control raw GR–I rubber containing no inhibitor was placed in a dark air oven maintained at a temperature of 110° C. Another piece of GR–I rubber which had had admixed 0.25% of 2,2-bis(2-hydroxy-3-t-butyl-5 methylphenyl)-propane was placed in the oven. In a similar manner other GR–I rubber samples had other well-known anti-oxidants admixed. Staudinger molecular weights were determined before and after the aging.

The results are supplied in graph form in Figure 1. These results indicate that 2,2-bis(2-hydroxy-3-t-butyl-5 methylphenyl)-propane was far superior to other phenolic type anti-oxidants tested for the prevention of molecular weight degradation.

EXAMPLE 3

2,2-bis(2-hydroxy-3-t-butyl-5 methylphenyl)-propane was compared for anti-oxidant effectiveness with the following other bis-phenol: diphenylol propane and 2,2-bis(2-hydroxy-3-5-t-butylphenyl)-propane, on GR–I rubber as exactly as in Example 2 above. After 12 days the rubber which had had 2,2-bis(2-hydroxy-3-t-butyl-5 methylphenyl)-propane admixed showed a molecular weight retention of 30% and 23% more than the other two bis-phenol-admixed rubbers.

EXAMPLE 4

2,2-bis(2-hydroxy-3-t-butyl-5 methylphenyl)-propane was tested for anti-oxidant effectiveness on hydrocarbon products such as a polyisobutylene synthetic rubber known as Vistanex and a composition consisting of paraffin wax containing 25% polyisobutylene. The results are given below and indicate clearly the excellent anti-oxidant effect of the compound of this invention.

*Oxidation results for phenolic anti-oxidants*

| Type of Sample | Blank No. Anti-Oxidant Present | Wt. of Additive | Results with 2,2-bis(2-hydroxy-3-t-butyl-5 methylphenyl)-propane |
| --- | --- | --- | --- |
| Half Life Time in Minutes [1] for MM polyisobutylene at 300° F | 13 | *Percent* 0.25 | ([3]) |
| Half Life Time in Hours [2] for polyisobutylene in paraffin wax at 350° F | 7 | 0.50 | 128 |

[1] Time in minutes on a six inch laboratory rubber mill at 300° F. for the 100,000 M. Wt. Staudinger polyisobutylene to reach 50% of its original M. Wt. The polymer is mill worked on a tight setting rubber mill.
[2] Time in hours for wax blend to obtain ½ of its original viscosity when held in a glass kinematic viscosity tube at 350° F. (It is important for wax blends of the indicated nature to maintain uniform viscosities for coating purposes e. g. on paper.)
[3] M. Wt. loss 35% in 300 minutes.

EXAMPLE 5

1% of 2,2-bis(2-hydroxy-3-t-butyl-5 methylphenyl)-propane was tested for anti-oxidant effect on Paracril 26 (a butadiene-acrylonitrile synthetic rubber). The results follow:

| Open Cup Test | 2,2-bis(2-hydroxy-3-t-butyl-5 methylphenyl)-Propane | Control |
| --- | --- | --- |
| Percent Gel in Polymer [1]— | | |
| After 0 days in Air at 60° C | 0 | 0 |
| After 7 days in Air at 60° C | 1 | 58 |
| After 11 days in Air at 60° C | 3 | 59 |
| After 15 days in Air at 60° C | 18 | 70 |

[1] Methyl ethyl ketone insoluble part.

It should be noted that almost four times as much viscous gel formed in the control as was formed in the sample which had had 2,2-bis(2-hydroxy-3-t-butyl-5 methylphenyl)-propane admixed.

EXAMPLE 6

2,2-bis(2-hydroxy-3-t-butyl-5 methylphenyl)-propane was tested as a color and heat stabilizer for S-polymer (a styrene, isobutylene copolymer). The per cent intrinsic viscosity retention was 85% as compared to 40% for the control. The color stability was excellent.

It is to be seen from the above examples that the compound of this invention provides markedly effective oxidation inhibition.

The synthetic rubbers which may be stabilized in accordance with this invention in addition to the GR–I are the polymers of monomeric materials consisting predominantly of a polymerizable conjugated diolefin having four to six carbon atoms, e. g., 1,3 butadiene, isoprene, 2,3-dimethylbutadiene-1,3,2-chlorobutadiene, piperylene, 2-methylpentadiene-1,3 and the like; hence synthetic rubbers of the above class include polymers of these materials and also copolymers prepared by the polymerization of monomer mixtures consisting predominantly of such a polymerizable butadiene-1,3 and also containing, if desired, other monoethylenically unsaturated compounds copolymerizable with butadienes-1,3, such as acrylonitrile, methyl methacrylate, styrene, alpha methyl styrene, vinyl naphthalene, vinyl ketones, vinylidene chloride, methyl acrylate, diethyl fumurate, and the like. Natural rubber is also stabilized by the compound of this invention.

The Vistanex (polyisobutylene synthetic rubber) compositions stabilized by the product of this invention have a Staudinger molecular weight of 12,000 to 300,000 with a preferable Staudinger molecular weight of 40,000 to 200,000.

The incorporation of 2,2-bis(2-hydroxy-3-t-butyl-5-methylphenyl)-propane with the synthetic rubber may be carried out simply by adding the compound either in the solid form or in solution, suspension or emulsion to the solid synthetic rubber during the milling operation or to a latex containing the synthetic rubber dispersed in an aqueous medium such as is ordinarily obtained by an emulsion polymerization process.

The amount of 2,2-bis(2-hydroxy-3-t-butyl-5 methylphenyl)-propane added to the normally oxidizable material in order to prevent oxidation varies with different materials.

Typical formulations are as follows:
Synthetic rubbers—0.1 to 5% by weight

The compound of this invention may be utilized in conjunction with other anti-oxidants in order to obtain desirable combinations of properties. Among the other anti-oxidant materials which may be employed are phenyl-beta-naphthylamine, naphthols, substituted naphthols, substituted phenols, substituted catechols, substituted hydroquinones, alkyl phenol sulfides, ketone-amine condensation products and the like.

The anti-oxidant compound of this invention has many advantages, among which are its extreme potency, ease of preparation, insolubility in water, good color retention, solubility in hydrocarbons, odorless character and low volatility.

If modifications for the methyl group in the 5 positions of the phenyl radicals of the compound of this invention are made, e. g. hydrogen, alkyl radicals and halogen radicals, the anti-oxidant activity is not destroyed. In the same manner, compounds made from the reaction between other lower and higher carbonyl compounds than acetone with the corresponding 2 tertiary butyl phenol compounds also exhibit some anti-oxidant activity.

It is to be understood that the invention is not limited to the specific examples which have been offered merely as illustrations, and that modifications may be made without departing from the spirit of the invention.

What is claimed is:

1. A stabilized solid synthetic rubber composition consisting of a solid synthetic rubber selected from the group consisting of copolymers of isoprene and isobutylene and a polyisobutylene having a Staudinger molecular weight in the range of 40,000 to 200,000, admixed with from 0.1 to 5 weight per cent of 2,2-bis(2-hydroxy-3-t-butyl-5 methylphenyl)-propane as an inhibitor against oxidative deterioration.

2. The stabilized synthetic rubber composition of claim 1 in which the synthetic rubber is a polyisobutylene.

3. The stabilized synthetic rubber composition of claim 1 in which the synthetic rubber is a copolymer of isoprene and isobutylene.

DAVID W. YOUNG.

REFERENCES CITED

The following references are of record in the file of this patent:

UNITED STATES PATENTS

| Number | Name | Date |
| --- | --- | --- |
| 1,977,627 | Greenhalgh | Oct. 23, 1934 |
| 2,069,573 | Bolton | Feb. 2, 1937 |
| 2,225,942 | Schneider et al. | Dec. 24, 1940 |
| 2,315,957 | Hewlett | Apr. 6, 1943 |
| 2,407,087 | Lieber et al. | Sept. 3, 1946 |
| 2,411,579 | Lieber et al. | Nov. 26, 1946 |
| 2,434,662 | Latham et al. | Jan. 20, 1948 |
| 2,471,887 | Nelson | May 31, 1949 |
| 2,515,906 | Stevens et al. | July 18, 1950 |
| 2,538,355 | Davis et al. | Jan. 16, 1951 |